G. E. PARKER.
BUTTON SETTING MACHINE.
APPLICATION FILED MAR. 14, 1910.
982,296.
Patented Jan. 24, 1911.
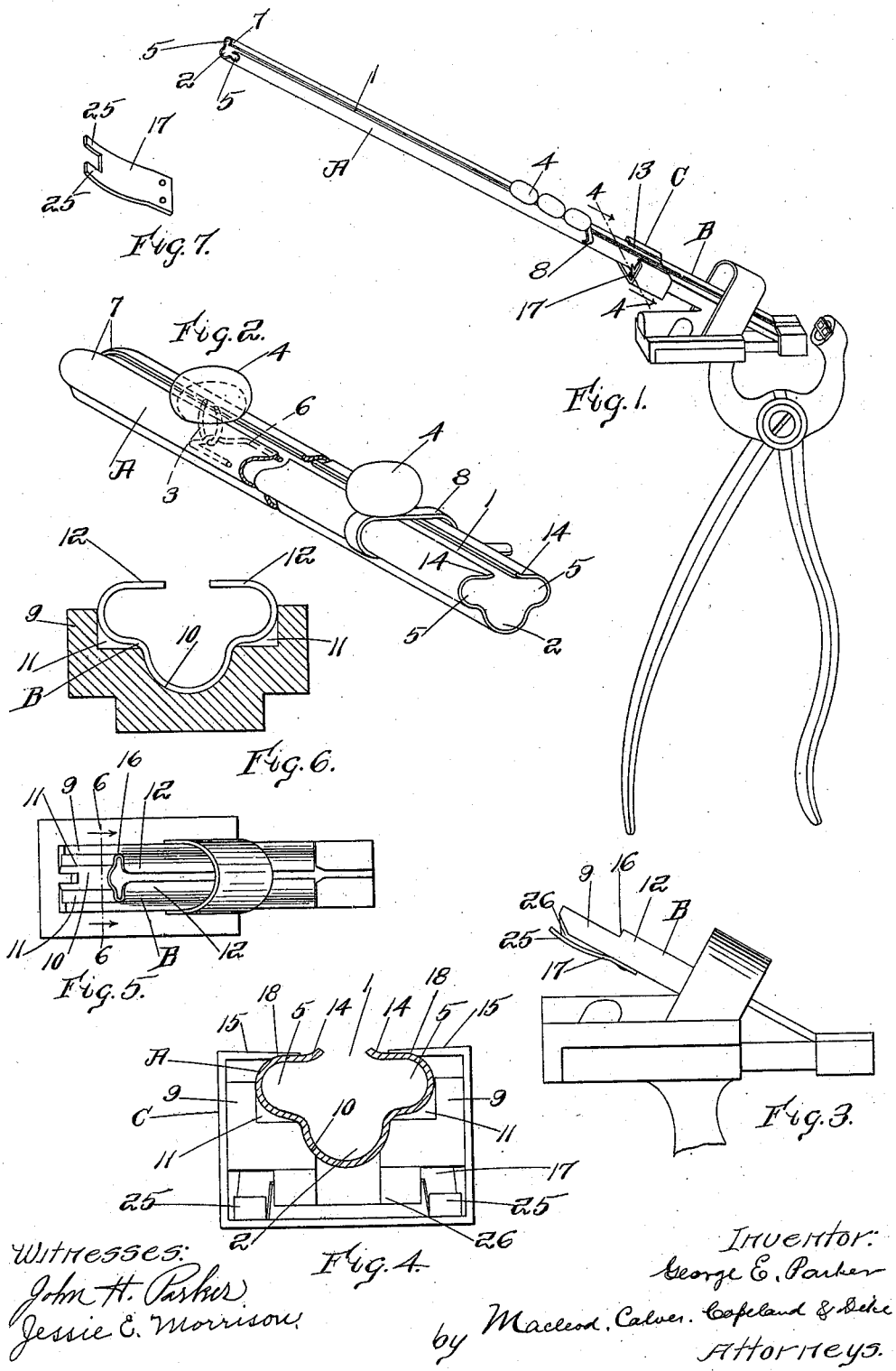
Witnesses:
John H. Parker
Jessie E. Morrison
Inventor:
George E. Parker
by Macleod, Calver, Copeland & Dike
Attorneys.

UNITED STATES PATENT OFFICE.

GEORGE E. PARKER, OF BROOKLINE, MASSACHUSETTS, ASSIGNOR TO HEATON-PENINSULAR BUTTON FASTENER COMPANY, OF BOSTON, MASSACHUSETTS, A CORPORATION OF MAINE.

BUTTON-SETTING MACHINE.

982,296.

Specification of Letters Patent.

Patented Jan. 24, 1911.

Original application filed December 15, 1909, Serial No. 533,161. Divided and this application filed March 14, 1910. Serial No. 549,161.

*To all whom it may concern:*

Be it known that I, GEORGE E. PARKER, a citizen of the United States, residing at Brookline, in the county of Norfolk and State of Massachusetts, have invented a certain new and useful Improvement in Button-Setting Machines, of which the following is a specification, reference being had therein to the accompanying drawings.
The invention relates to an improvement in button-setting machines for attaching buttons with connected fasteners to boots, shoes or other articles.

The present application is a division of an application filed by me December 15, 1909, Serial No. 533,161. In said prior application, of which this is a division, there is shown and described a feed-chute which is adapted to also constitute a package in which the buttons and fasteners threaded together may be shipped and handled until ready for application to the machine or setting implement and which is adapted to be readily connected with the setting machine or implement to feed the buttons thereto when it is desired to attach the buttons to the article for which they are intended.

The object of the invention covered by the present application is to combine with the setting implement an attachment whereby the feed-tube may be readily attached to and detached from the setting implement and provide a convenient feed-connection between the feed-tube and the setting implement.

The invention will be fully understood from the following description taken in connection with the accompanying drawings, and the novel features are pointed out and clearly defined in the claims at the close of the specification.

In the drawings,—Figure 1 is a perspective view showing a setting tool with a feed-tube attached thereto embodying the invention. Fig. 2 is a perspective view of the feed-tube and clip on an enlarged scale. Fig. 3 is a side elevation, enlarged, of a portion of the setting implement showing the sluiceway with which the feed-tube is to be connected and a friction spring for binding the coupling to the feed-tube and sluiceway. Fig. 4 is an enlarged section on line 4—4 of Fig. 1. Fig. 5 is a plan view of the sluiceway of the setting implement, the de- tachable feed-tube and coupling being removed. Fig. 6 is an enlarged section on line 6—6 of Fig. 5. Fig. 7 is an enlarged detail view of the friction spring.

For convenience the same letters and numerals will be used to indicate corresponding parts in the present application as are employed in said previous application.

Referring to the drawings,—A represents the feed tube, B the slotted sluiceway of a setting-tool which receives the buttons and fasteners from the feed-tube and conducts them to the setting jaws of the implement and C represents the coupling for connecting the feed-tube with the sluiceway.

The feed-tube A is provided with a slot 1 extending lengthwise thereof on the upper side through which the shanks of the buttons pass and is provided with a channel or run way 2 in the bottom of the feed-tube to afford clearance for the eyes 3 of the buttons 4 and is formed with the two opposite lateral guide ways or grooves 5, 5, for the guidance and passage of the fasteners 6, the fasteners lying with their legs extending substantially at right angles to the shank of the button in sliding down the feed-tube as shown in Fig. 2.

In order to retain the buttons and fasteners in the tube after the tube is filled until it is desired to connect it with the setting device, a stop is provided at each end of the tube to prevent the buttons from sliding out endwise. The particular means for doing this is not material to the present branch of the invention. One means of doing this is the means shown in the drawings and forms part of the invention claimed in said application, Serial No. 533,161; that is, to bend or crimp in slightly that end of the tube which is the outermost when the tube is attached to the setting implement as indicated at 7. To prevent them from sliding out at the feed end of the tube until ready for use, a spring clip 8 is provided which may be sprung on over the upper side of the feed-tube at any point desired. After the feed-tube is connected with the setting tool by the coupling, the spring clip may be removed from the lower end so as to allow the buttons to feed.

The sluiceway B of the setting implement is formed with a rearwardly extending grooves trough 9 having a bottom groove or channel 10 corresponding with the bottom groove or channel 2 of the feed-tube and lateral channels 11 corresponding with the lateral grooves 5 of the feed-tube to support the legs of the fastener. The said trough is open at the top. The flange guides 12, 12, of the sluiceway B rise above the top of the trough so that the rear ends 16 of the said flange guides will form a shoulder against which the end of the coupling will abut.

The coupling C is tubular with a longitudinal slot 13 throughout its length on the upper side, the interior cross-sectional contour of the coupling being such that it will slide or telescope onto the outside of the trough of the sluiceway. In the form shown it is substantially rectangular in cross-section, except for the slot in the top. The slot 13 through the coupling C is somewhat wider than the slot 1 through the feed-tube.

The flanges 14 on each side of the slot 1 in the feed-tube are turned upward, preferably substantially at least as high as the top of the flanges 15 of the coupling C, so that the heads of the buttons as they ride down the feed-tube will ride on the elevated edges of the flanges 14, and as they pass through the slotted way of the coupling the laterally projecting head of the button projects beyond the inclined flanges of the feed-tube. As the button and fastener enter the slotted way of the coupling, the head of the button will be raised sufficiently so that it will not strike against the ends of the flanges of the coupling. Preferably the flanges of the feed-tube are concaved slightly in cross-section as will be seen by reference to Fig. 4 so that the upward incline will be curved instead of straight. Preferably the flanges 15 of the coupling are thinned down toward the inner edges, thereby rendering the coupling more easily spread open to permit sliding it into clamping position and preferably also the under side 18 of the thinned edge is curved to fit on the curve of the feed-tube so as to avoid a square shoulder. The forward end of the coupling buts up against the shoulder 16 formed by the ends of the flange guides 12 of the sluiceway B. The inclined edges of the flanges 14 of the feed-tube should be substantially on a level with the flange guides 12 of the sluiceway, so that the buttons will slide freely from the feed-tube onto the flanges of the sluiceway B.

On the underside of the curved trough 9 of the sluiceway is a forked spring 17, the forward end of which is secured to the under side of the sluiceway, the rear end being free and preferably forked, being normally at a little distance below the sluiceway and adapted to be moved up under tension, the forked ends 25 of which will straddle the downwardly projecting tongue portion 26 of the trough 9. When the coupling C is telescoped onto the end of the trough of the sluiceway it will engage the spring 17 and press it upwardly toward the trough, the purpose of the spring being to hold the coupling firmly by an elastic pressure in engagement with the trough of the sluiceway. When the supply of buttons and fasteners in the feed-tube is exhausted, the feed-tube may be removed from the setting implement and another loaded feed-tube substituted.

What I claim is:

1. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, and a slotted coupling which is adapted to clamp a feed-tube to said trough.

2. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, and a slotted movable coupling which is adapted to clamp a feed-tube to said trough, the slot in said coupling being wider than the slot in said sluiceway.

3. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, and means for clamping a feed-tube to said trough projection.

4. A button-setting machine for buttons and attached fasteners having a longitudinally slotted sluiceway, a grooved trough projection in which said sluiceway is seated and connected therewith, said trough projection extending beyond the end of the sluiceway and adapted to form a seat for a feed-tube, the end of said sluiceway forming a stop for the end of a feed-tube.

5. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, the slot in the trough being wider than the slot in the sluiceway, and a slidable tubular coupling which is adapted to connect a feed-tube with said trough, said tubular coupling having a longitudinal slot throughout its length in alinement with the longitudinal slot of the sluiceway.

6. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, a slidable tubular coupling which is adapted to connect a feed-tube with said trough, said tubular coupling having a longitudinal slot throughout its length in alinement with the longitudinal slot of the sluiceway, and a binding spring between the sluiceway and the coupling which forms a yielding friction-binder between the tubular coupling and the trough.

7. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a slotted feed-tube when the end of the feed-tube is brought into engagement with the end of said sluiceway, a slidable tubular coupling which is adapted to connect a feed-tube with said trough, said tubular coupling having a longitudinal slot throughout its length in alinement with the longitudinal slot of the sluiceway, and a binding spring between the sluiceway and the coupling which forms a yielding friction-binder between the tubular coupling and the trough, the flanges of said coupling on each side of the longitudinal slot being thinned on their under sides toward the edges.

8. A button-setting machine for buttons and attached fasteners having a longitudinally slotted sluiceway, a grooved trough projection connecting with said sluiceway and projecting beyond the end thereof, having a groove in alinement with the slot in the sluiceway and which is adapted to form a seat for a feed-tube when the end of the feed-tube is brought into engagement with the end of said sluiceway, said trough sluiceway having vertical flanges on the sides which form guides for the connecting end of a feed-tube and a tubular coupling having a longitudinal slot throughout its length in the upper side which is adapted to clamp a feed-tube to its seat in said trough.

9. A button-setting machine for buttons and attached fasteners having a longitudinally slotted sluiceway, a grooved trough projection connected with said sluiceway and projecting beyond the end thereof, having a groove in alinement with the slot in the sluiceway and which is adapted to form a seat for a feed-tube when the end of the feed-tube is brought into engagement with the end of said sluiceway, said trough sluiceway having vertical flanges on the sides which form guides for the connecting end of a feed-tube and a tubular coupling having a longitudinal slot throughout its length in the upper side which is adapted to clamp a feed-tube to its seat in said trough, the bottom of said trough being bifurcated at its outer end and a binding-spring secured to the under side of the trough having its outer end free and bifurcated and forming a yielding friction-binder between said coupling and the trough.

10. A button-setting machine for buttons and attached fasteners having a sluiceway with a longitudinal slot for the buttons and attached fasteners which is adapted to be connected with a button-feed tube and a slidable tubular coupling which is adapted to connect said sluiceway with a detachable feed-tube.

11. A button-setting machine for buttons and attached fasteners having a sluiceway with a longitudinal slot for the buttons and attached fasteners which is adapted to be connected with a button-feed tube and a slidable tubular coupling which is adapted to connect said sluiceway with a detachable feed-tube, the flanges of said coupling on each side of the longitudinal slot being thinned on their under side toward the edges.

In testimony whereof I affix my signature, in presence of two witnesses.

GEORGE E. PARKER.

Witnesses:
   Geo. E. Parker, Jr.,
   Alice H. Morrison.